United States Patent
Ory

(10) Patent No.: US 8,789,844 B2
(45) Date of Patent: Jul. 29, 2014

(54) INFLATABLE AIRBAG ARRANGEMENT COMPRISING A REINFORCED FLAP

(75) Inventor: Daniel Ory, Le Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 157 days.

(21) Appl. No.: 13/636,681

(22) PCT Filed: Mar. 23, 2011

(86) PCT No.: PCT/EP2011/001443
§ 371 (c)(1),
(2), (4) Date: Jun. 20, 2013

(87) PCT Pub. No.: WO2011/116949
PCT Pub. Date: Sep. 29, 2011

(65) Prior Publication Data
US 2014/0159352 A1    Jun. 12, 2014

(30) Foreign Application Priority Data
Mar. 24, 2010 (FR) .................................... 10 52134

(51) Int. Cl.
*B60R 21/216* (2011.01)

(52) U.S. Cl.
CPC .................................... *B60R 21/216* (2013.01)
USPC .......................... 280/728.3; 280/732; 280/733

(58) Field of Classification Search
CPC ....................................................... B60R 21/26
USPC ....................................... 280/728.3, 732, 733
See application file for complete search history.

(56) References Cited

U.S. PATENT DOCUMENTS

| | | | |
|---|---|---|---|
| 5,308,111 A | | 5/1994 | Sommer |
| 5,385,366 A | * | 1/1995 | Frank et al. ................ 280/728.3 |
| 5,460,401 A | * | 10/1995 | Gans et al. ................ 280/728.3 |
| 5,533,746 A | * | 7/1996 | Whited ....................... 280/728.2 |
| 6,082,760 A | * | 7/2000 | Ukai et al. ................. 280/728.3 |
| 6,203,056 B1 | * | 3/2001 | Labrie et al. .............. 280/728.3 |
| 7,029,027 B2 | * | 4/2006 | Gray et al. ................. 280/728.3 |
| 7,118,123 B2 | * | 10/2006 | Weissert et al. ........... 280/728.3 |
| 8,657,328 B2 | * | 2/2014 | Ory ............................. 280/728.3 |
| 2005/0127642 A1 | * | 6/2005 | Weissert et al. ........... 280/728.3 |

FOREIGN PATENT DOCUMENTS

| | | |
|---|---|---|
| EP | 0872389 | 10/1998 |
| JP | 7076253 | 3/1995 |
| JP | 10291455 | 11/1998 |

OTHER PUBLICATIONS

International Search Report for PCT/EP2011/001443 dated Jun. 22, 2011, 3 pages (translated).

* cited by examiner

*Primary Examiner* — Karen Beck
(74) *Attorney, Agent, or Firm* — Reising Ethington P.C.

(57) ABSTRACT

The invention relates to a motor vehicle inflatable airbag arrangement (1) comprising a flap (3) covering an inflatable airbag module.
This flap (3), which comprises a body (5) to which a reinforcing plate (13) is fixed, is articulated with respect to a fixed part (2) so as to open upon inflation of the airbag, and a linear tether (26) is secured to the flap (3) and to the fixed part (2) so as to limit the opening of the flap (3) when the airbag inflates. The linear tether (26) is fixed to the flap (3) by being sandwiched between the body (5) and the plate (13) fixed to this body (5).
The flap (3) comprises a reinforcing rod (22) interposed between the plate (13) and the tether (26), this reinforcing rod (22) running alongside the outline of the flap (3) at least in the region where the tether (26) protrudes beyond this outline.

7 Claims, 1 Drawing Sheet

INFLATABLE AIRBAG ARRANGEMENT COMPRISING A REINFORCED FLAP

The invention relates to an inflatable airbag arrangement with which a motor vehicle instrument panel is equipped and which is positioned, for example, to protect the passenger seated beside the driver of this vehicle.

BACKGROUND OF THE INVENTION

Such an arrangement comprises a flap that forms an integral part of the instrument panel body while having its generally rectangular outline delimited by a precut made in the underside face of the instrument panel body so that this flap is not visible to an occupant of the vehicle.

An inflatable airbag module is fixed to the underside face of the instrument panel body, in the region of the flap, so that when airbag inflation is triggered, this airbag applies pressure to the underside face of the flap to cause this flap to open by breaking along the precut line. The opening of the flap then allows the airbag to deploy into the passenger compartment of the vehicle in order to protect the corresponding occupant.

Such a flap typically has a rectangular outline and is articulated with respect to the rest of the body of the instrument panel at the transverse edge of its outline that is closest to the windshield of the vehicle.

In order to prevent the flap from striking the windshield as it opens, it is known practice to provide one or more tethers which are fixed to the flap and to the rest of the instrument panel body.

This or these tether or tethers protrude beyond the opposite edges of the outline of the flap which are oriented in the direction of forward travel of the vehicle, and are secured to a fixed part of the assembly while at the same time being relatively slack between this fixed part and the flap. When the airbag inflates, the opening of the flap is limited by the length of the tether or tethers which then become taut when the flap reaches a certain degree of opening.

In one solution known from Patent Document EP0872389, a single tether is provided, in the form of a loop the two strands of which extend transversely over the entire width of the flap, and the ends of which are secured to fixed attachments situated at the level of the airbag module. This looplike tether is secured to the flap by being interposed between the underside face of the flap body and a flap reinforcing plate which is fixed to this underside.

In practice, the speed with which the airbag inflates generates significant mechanical stresses in the flap when the tethers suddenly become taut under the effect of this inflation in order to limit the opening of the flap.

These stresses may cause the reinforcing plate and/or the flap body to tear or even to be destroyed, thereby generating a risk of the broken parts of this plate being thrown out toward the occupant or occupants of the vehicle.

OBJECT OF THE INVENTION

The object of the invention is to propose a solution to remedy this disadvantage.

SUMMARY OF THE INVENTION

To this end, the subject of the invention is a motor vehicle inflatable airbag arrangement comprising a flap covering an inflatable airbag module, this flap comprising a flap body to which a reinforcing plate is fixed and being articulated with respect to a fixed part so as to open upon inflation of the airbag, and comprising a linear tether comprising a central portion secured to the flap, and two lateral portions protruding from two opposite edges of the flap so as to be secured to a fixed part in order to limit the opening of the flap when the airbag inflates, the linear tether having its central portion fixed to the flap by being sandwiched between the flap body and the reinforcing plate fixed on the underside face of this flap body, characterized in that the flap comprises a reinforcing rod running alongside the outline of this flap at least in the regions in which the tether protrudes beyond the opposite edges of this flap, the tether being situated between the reinforcing rod and the flap body in the regions in which this tether protrudes beyond the opposite edges of this flap.

Thanks to the reinforcing rod, the risk of the reinforcing plate and/or the flap breaking when the tethers are suddenly placed under tension is almost eliminated because the mechanical forces applied by the tether to the reinforcing plate are transferred to this plate via the rod which thus spreads these forces along the edge of the reinforcing plate. The risk of flap breakage is thus more or less eliminated.

The invention also relates to an arrangement as defined hereinabove, in which the reinforcing rod is interposed between the reinforcing plate and the tether in regions in which this tether protrudes beyond the opposite edges of the flap.

The invention also relates to an arrangement as defined hereinabove, in which the reinforcing rod is overmolded in the reinforcing plate.

The invention also relates to an arrangement as defined hereinabove, in which the reinforcing rod is made of metal.

The invention also relates to an arrangement as defined hereinabove, in which the metal rod runs alongside the entire outline of the flap.

The invention also relates to an arrangement as defined hereinabove, in which the reinforcing rod nestles between ribs of the reinforcing plate by means of which ribs this plate is fixed to the flap body.

The invention also relates to an arrangement as defined hereinabove, in which the ribs of the reinforcing plate are oriented perpendicular to the opposite edges of the flap beyond which the tether protrudes, and in which each rib comprises a notch to accommodate the reinforcing rod.

DETAILED DESCRIPTION OF THE INVENTION

The idea underlying the invention is that of providing a rod that runs alongside the outline of the flap in the region where the tether protrudes beyond this flap so that the mechanical stress applied by the tether as it becomes taut is spread all along the rod on the reinforcing plate.

Figure 1:
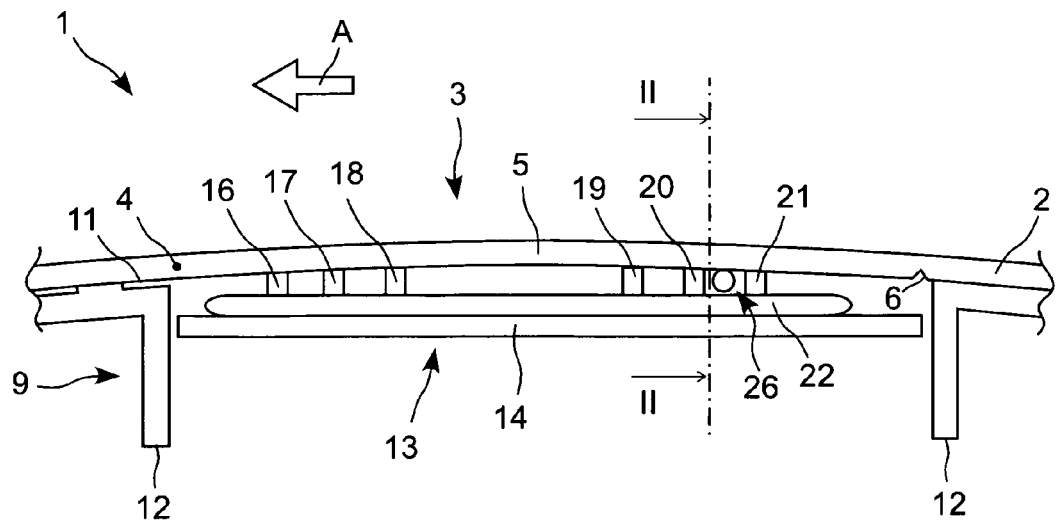
FIG. 1 is a schematic depiction partially showing the arrangement according to the invention on a vertical plane of section oriented in the direction of forward travel of the vehicle.

As may be seen in FIG. 1, in which the invention bears the overall reference 1, an instrument panel body 2, which in this instance has a curved shape, comprises a flap 3 capable of pivoting about a transverse axis referenced 4 corresponding to the front transverse edge of this flap 3, this axis 4 extending in a plane normal to FIG. 1.

This flap 3 comprises a flap body 5 that forms an integral part of the instrument panel body 2 while being delimited on the one hand by the axis 4 and on the other hand by a U-shaped precut. This precut defines the two opposite lateral edges of this flap 3, referenced 7 and 8 in FIG. 2, which extend parallel to the direction of forward travel of the vehicle identified by the arrow A in FIG. 1, and the rear transverse edge of the flap body 5 which is referenced 6 in FIG. 1.

A firing channel with the general reference 9 is fixed to the underside face 11 of the instrument panel, being positioned to surround the outline of the flap. This firing channel 9 has the overall shape of a portion of conduit, oriented in a direction normal to the instrument panel body 2. The upper end of this canal 9 conforms to the curvature of the underside face 11, but its lower end rather defines a flat face referenced 12 which is intended to accept an inflatable airbag module, not depicted.

The flap 3 is formed by the flap body 5 strengthened by a reinforcing plate 13 fixed to its underside face, and to which the airbag applies its pressure in order to cause the flap to open by breaking the precut upon deployment.

This reinforcing plate 13 is made of a plastic or the like, being formed of a main wall 14 provided with a set of ribs, in this instance six ribs referenced 16 to 21.

Figure 2:
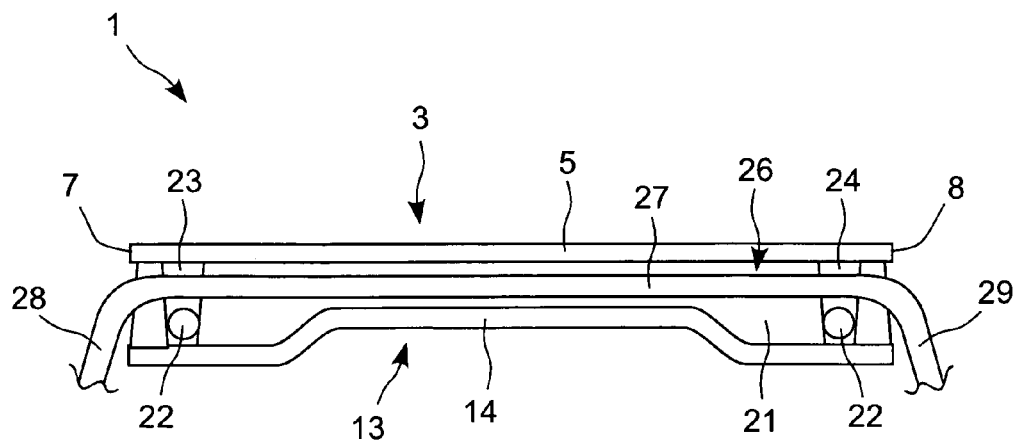
FIG. 2 is a partial schematic depiction of the arrangement according to the invention on a plane of section that is transverse with respect to the direction of forward travel of the vehicle.

As can be seen in FIGS. 1 and 2, the main wall 14 is oriented parallel to the flap body 5 and the ribs 16-21 protrude beyond the upper face of this main wall and run transversely with respect to the direction of forward travel A.

The reinforcing plate is fixed to the underside face of the flap body 5 for example using an ultrasound welding technique, by means of which the upper edges of the ribs 16-21 are secured to the underside face of the flap body 5. Thus, when the flap 3 is assembled, the main wall 14 is separated from the flap body 5 by a distance corresponding to the height of the ribs in order to define a space partitioned by these ribs.

The flap 3 also comprises a reinforcing rod 22 which is bent into a rectangular shape corresponding to that of the outline of the flap while having dimensions appreciably smaller than those of the outline.

This reinforcing rod 22 may be a metal rod, but it may also be made of some other material such as a plastic that is more rigid than the reinforcing plate 13. This reinforcing rod may thus be made of polyamide or even of polypropylene containing glass fibers.

This rod 22 nestles in between the ribs of the reinforcing plate 13 to occupy a position in which it more or less presses against the upper face of the main wall 14 and in which it internally runs alongside the periphery of the flap body 5 and of the reinforcing plate 13.

For this purpose each transverse rib 16-21 is provided at each of its ends with a notch oriented perpendicular to the main wall 14 and opening into the upper edge of this rib. The two notches of the rib 21 are depicted in FIG. 2, where they are referenced 23 and 24.

The tether that retains the flap 3, referenced 26 in the figures, is a linear tether comprising a central portion 27 which is fitted in between the two contiguous ribs 20 and 21 closest to the transverse edge 6, being superposed on the reinforcing rod 22 which is thus interposed between the tether 26 and the main wall 14.

The central portion 27 of the tether 26 is extended by two lateral portions referenced 28 and 29 which respectively protrude beyond the lateral edges 7 and 8 of the flap 3, each of these portions being attached to a fixed part, not depicted, such as an attachment lug for example, which is fixed to the firing channel, or alternatively to the instrument panel body 2, or even to the airbag module.

When the airbag inflates, it first of all deploys in the firing channel 9 until it comes to press against the wall 14 of the flap 3, applying pressure thereto that causes the instrument panel to tear along the precut 6, and therefore causing the flap to open.

The opening of the flap 3 causes sudden tensioning of the portions 28 and 29 of the tether which then apply a mechanical force to the wall 14 via the reinforcing rod 22 which is interposed between this tether and the wall 14. Thanks to this reinforcing rod 22, the force applied by the tether suddenly tensioned is spread all along the rod 22, thereby reducing the mechanical stress experienced by the reinforcing plate when the flap is immobilized in the open position.

The flap of the arrangement according to the invention may advantageously be assembled by first of all nestling the reinforcing rod 22 on the reinforcing plate 13, then by placing the central portion 27 of the tether 26 between the ribs 20 and 21 and fixing the reinforcing plate equipped with these two elements to the underside face of the flap body 5 using ultrasonic welding or some other technique.

In the example of the figures, the reinforcing rod nestles on the reinforcing plate, but it is just as conceivable for it to be completely or partially overmolded in this reinforcing plate.

The invention claimed is:

1. A motor vehicle inflatable airbag arrangement comprising a flap covering an inflatable airbag module, this flap comprising a flap body to which a reinforcing plate is fixed and being articulated with respect to a fixed part so as to open upon inflation of the airbag, and comprising a linear tether comprising a central portion secured to the flap, and two lateral portions protruding from two opposite edges of the flap so as to be secured to a fixed part in order to limit the opening of the flap when the airbag inflates, the linear tether having its central portion fixed to the flap by being sandwiched between the flap body and the reinforcing plate fixed on the underside face of this flap body, characterized in that the flap comprises a reinforcing rod running alongside the outline of this flap at least in the regions in which the tether protrudes beyond the opposite edges of this flap, the tether being situated between the reinforcing rod and the flap body in the regions in which this tether protrudes beyond the opposite edges of this flap.

2. The arrangement as claimed in claim 1, in which the reinforcing rod is interposed between the reinforcing plate and the tether in regions in which this tether protrudes beyond the opposite edges of the flap.

3. The arrangement as claimed in claim 1, in which the reinforcing rod is overmolded in the reinforcing plate.

4. The arrangement as claimed in claim 1, in which the reinforcing rod is made of metal.

5. The arrangement as claimed in claim 1, in which the reinforcing rod runs alongside the entire outline of the flap.

6. The arrangement as claimed in claim 1, in which the reinforcing rod nestles between ribs of the reinforcing plate by means of which ribs this plate is fixed to the flap body.

7. The arrangement as claimed in claim 6, in which the ribs of the reinforcing plate are oriented perpendicular to the opposite edges of the flap beyond which the tether protrudes, and in which each rib comprises a notch to accommodate the reinforcing rod.

* * * * *